(12) United States Patent  (10) Patent No.: US 9,209,732 B2
Radan  (45) Date of Patent: Dec. 8, 2015

(54) POWER SUPPLY SYSTEM OF MARINE VESSEL

(71) Applicant: Damir Radan, Sandnes (NO)

(72) Inventor: Damir Radan, Sandnes (NO)

(73) Assignee: Siemens Aktiengesellschaft, München (DE)

( * ) Notice: Subject to any disclaimer, the term of this patent is extended or adjusted under 35 U.S.C. 154(b) by 28 days.

(21) Appl. No.: 14/358,999

(22) PCT Filed: Nov. 7, 2012

(86) PCT No.: PCT/EP2012/071977
§ 371 (c)(1),
(2) Date: May 16, 2014

(87) PCT Pub. No.: WO2013/072226
PCT Pub. Date: May 23, 2013

(65) Prior Publication Data
US 2014/0320092 A1  Oct. 30, 2014

(30) Foreign Application Priority Data
Nov. 17, 2011 (EP) ..................... 11189595

(51) Int. Cl.
| F02D 29/06 | (2006.01) |
| H02P 9/04 | (2006.01) |
| H02P 9/10 | (2006.01) |
| B63H 23/24 | (2006.01) |
| H02J 3/00 | (2006.01) |
| H02J 4/00 | (2006.01) |
| B63J 3/02 | (2006.01) |
| H02P 11/00 | (2006.01) |
| H02H 7/06 | (2006.01) |
(Continued)

(52) U.S. Cl.
CPC ............... *H02P 9/107* (2013.01); *B63H 23/24* (2013.01); *B63J 3/02* (2013.01); *H02J 3/006* (2013.01); *H02J 4/00* (2013.01); *H02J 2003/388* (2013.01)

(58) Field of Classification Search
USPC ................ 290/40 B; 323/246; 322/20, 28
See application file for complete search history.

(56) References Cited

U.S. PATENT DOCUMENTS 7,045,913 B2 * 5/2006 Ebrahim et al. ............. 290/52
7,078,825 B2 * 7/2006 Ebrahim et al. ............. 290/52
(Continued)

FOREIGN PATENT DOCUMENTS

EP  1914162  4/2008
WO  2008098370  8/2008

OTHER PUBLICATIONS

European Search Report in corresponding European Patent Application No. EP 11 18 9595, dated Oct. 4, 2012, 8 pages.
(Continued)

*Primary Examiner* — Pedro J Cuevas
(74) *Attorney, Agent, or Firm* — Lempia Summerfield Katz LLC

(57) ABSTRACT

A power supply system configured to couple to a power distribution bus of a marine vessel and to power a plurality of electric motors coupled to the power distribution bus. The power supply system includes a generator configured to generate electric power and a control system coupled to the generator and configured to control the output voltage of the generator based on a voltage setpoint. The control system includes a measuring unit configured to measure a parameter of the electric power generated by the generator and a control unit configured to control the voltage setpoint for the output voltage of the generator based on the measured parameter.

21 Claims, 9 Drawing Sheets

(51) Int. Cl.
 *H02J 3/12* (2006.01)
 *H02J 3/38* (2006.01)

(56) References Cited

U.S. PATENT DOCUMENTS

| | | | |
|---|---|---|---|
| 7,228,206 B2 | 6/2007 | Kahle et al. | |
| 8,159,178 B2 * | 4/2012 | Serban | 320/101 |
| 8,379,839 B2 * | 2/2013 | Nagarajaiah et al. | 379/413.01 |
| 8,560,201 B2 * | 10/2013 | Morrow et al. | 701/99 |
| 9,035,480 B2 * | 5/2015 | Fortmann | 290/44 |
| 9,083,177 B2 * | 7/2015 | Andersen et al. | 318/34 |
| 2004/0008010 A1 * | 1/2004 | Ebrahim et al. | 322/44 |
| 2006/0066113 A1 * | 3/2006 | Ebrahim et al. | 290/52 |
| 2010/0038907 A1 * | 2/2010 | Hunt et al. | 290/7 |
| 2010/0241283 A1 * | 9/2010 | Desai et al. | 700/295 |
| 2011/0033039 A1 * | 2/2011 | Nagarajaiah et al. | 379/413.01 |
| 2011/0043160 A1 * | 2/2011 | Serban | 320/101 |
| 2013/0041516 A1 * | 2/2013 | Rockenfeller et al. | 700/287 |
| 2013/0215543 A1 * | 8/2013 | Hoeven | 361/63 |
| 2013/0270902 A1 * | 10/2013 | Andersen et al. | 307/9.1 |
| 2013/0271879 A1 * | 10/2013 | Andersen et al. | 361/20 |
| 2013/0314132 A1 * | 11/2013 | Fukuta et al. | 327/109 |
| 2013/0314959 A1 * | 11/2013 | Hu | 363/84 |
| 2014/0022827 A1 * | 1/2014 | Permuy | 363/34 |
| 2014/0307495 A1 * | 10/2014 | Fukuta et al. | 363/98 |

OTHER PUBLICATIONS

International Preliminary Report on Patentability in PCT/EP2012/071977, dated Feb. 18, 2014, 17 pages.
International Search Report and Written Opinion in PCT/EP2012/071977, dated Sep. 13, 2013, 10 pages.

* cited by examiner

FIG 7
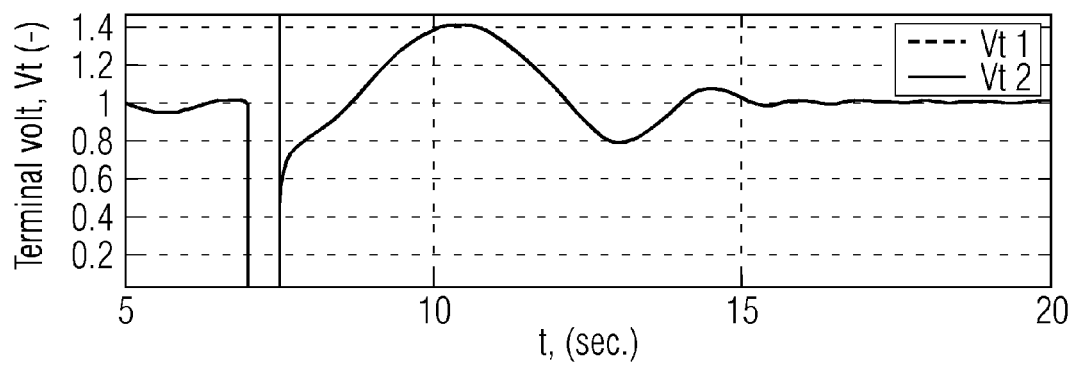
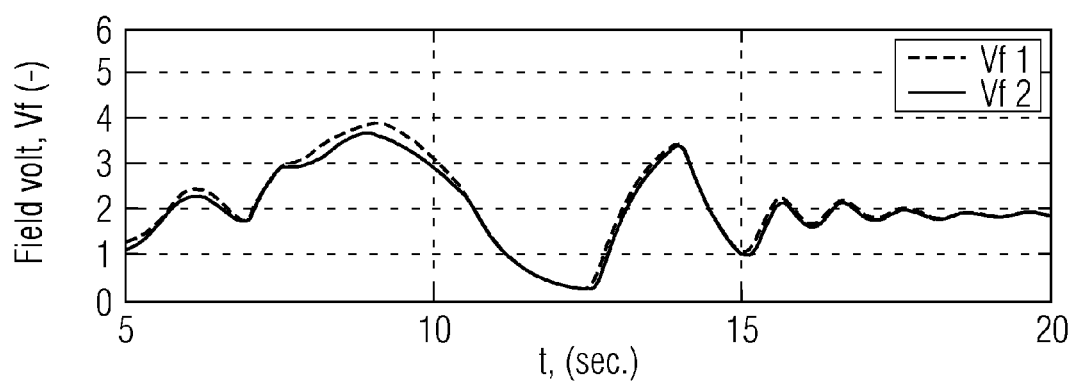
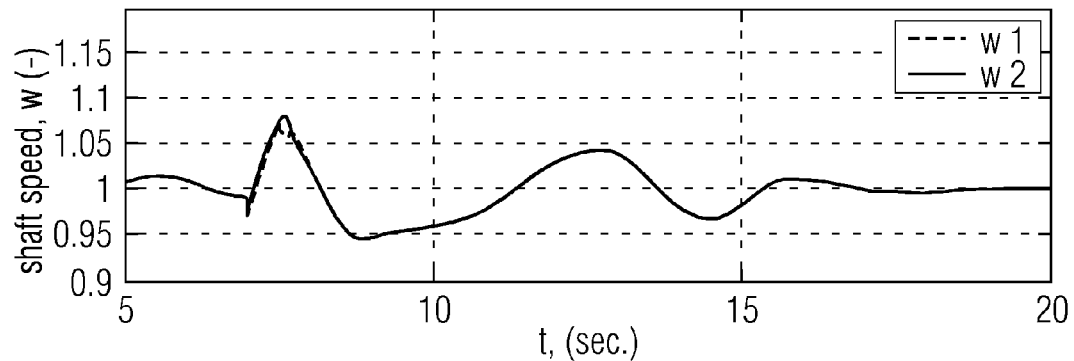

POWER SUPPLY SYSTEM OF MARINE VESSEL

RELATED APPLICATIONS

This application is the National Stage of International Application No. PCT/EP2012/071977, filed Nov. 7, 2012, which claims the benefit of European Patent Application No. EP 11189595.9, filed Nov. 17, 2011. The entire contents of both documents are hereby incorporated herein by reference.

TECHNICAL FIELD

The present teachings relate generally to a power supply system for a marine vessel and to a power system of a marine vessel. In some embodiments, the present teachings relate to a method of operating a power supply system of a marine vessel.

BACKGROUND

Marine vessels (e.g., offshore platforms, drilling vessels, or production vessels) often include independent power systems that have a generator coupled to a source of mechanical energy (e.g., a diesel engine or a gas turbine). Electric power produced by the generator is distributed over a power distribution bus that is connected to a plurality of consumers. Large consumers include thruster drives, a drilling drive, or draw works. Smaller consumers may be pumps, compressors, and other electric devices provided on a marine vessel.

Unlike onshore power systems that may derive electric energy from a plurality of sources, the isolated power systems of marine vessels have a relatively low number of generators installed (e.g., 4 to 6). Due to the short cable routes, the use of bus bars and the absence of transformers in the path, the impedances between the generators may be low (e.g., almost insignificant). If there is a fault in the power system (e.g., a bus bar fault or a generator interconnection cable fault), a high voltage dip may occur due to the low impedances. Electric motors connected to the power system may operate under a significantly reduced current supply and, as a result, slow down. For example, the power system of the marine vessel may have tens or hundreds of small electric motors (e.g., direct online or DOL induction motors) connected.

After the fault is cleared, the electric motors will increase speed back to nominal, thereby resulting in a significant inrush current. In some systems, an automatic voltage regulator (AVR) controls the generator and, therefore, the voltage on the main power distribution bus. During system recovery after the fault, a voltage overshoot may occur as the AVR tries to compensate for the voltage drop. The overshooting may be higher than 150%. If the marine vessel is in transit, the marine vessel may operate in a DP2 mode (e.g., according to dynamic positioning 2 specifications of Det Norske Veritas (DNV)). In the DP2 mode of operation, the voltage overshot may not be a problem. If the overshoot leads to a blackout of another component that is non-essential to DP2 operation, the component may be isolated from the system and repaired. On the other hand, if the vessel operates in a DP3 mode (e.g., when performing a drilling operation), the bus tie breakers of the power distribution bus are open, and the power system of the marine vessel is split into several independent power systems. For example, two, three or four sections of the power distribution bus may be provided. Each of the sections operates as an independent redundant power system. If there is a fault in one of the subsystems, the other subsystems will not be affected since the other subsystems are electrically isolated from the faulty subsystem. Thus, a voltage overshoot that may occur after resuming operation of a faulty subsystem will not be experienced by the remaining subsystems.

Although operating the power system with open bus tie breakers provides redundancy and avoids a complete blackout in the case of a fault in a component, there is a disadvantage in that a generator is operated in each subsection, and the operation of the generators may be ineffective. Some generators may operate at maximum capacity while other generators may operate only close to idle.

SUMMARY AND DESCRIPTION

The scope of the present invention is defined solely by the appended claims, and is not affected to any degree by the statements within this summary.

The present embodiments may obviate one or more of the drawbacks or limitations in the related art. For example, in some embodiments, an improved power supply system for a marine vessel that mitigates at least some of the drawbacks described above is provided.

It is desirable to operate the power system with closed bus tie breakers while at the same time providing fault resistant operation wherein the requirements according to the DP3 specifications are met. Furthermore, it is desirable that a fault in one component does not affect the operation of the remaining components (e.g. generators and drives) of the remaining sections of the power system.

In some embodiments, a power supply system of a marine vessel is provided. The power supply system is configured for coupling to a power distribution bus of the marine vessel and for powering a plurality of electric motors coupled to the power distribution bus. The power supply system includes a generator configured for generating electric power. In operation, the generator provides an output voltage at an output of the generator. The output voltage is an alternating current (AC) voltage. The power supply system further includes a control system coupled to the generator and configured to control the output voltage of the generator in accordance with a voltage setpoint. In operation, the voltage setpoint is set to an operating voltage setpoint. The control system includes a measuring unit configured to measure a parameter of the electric power generated by the generator. The parameter is indicative of a fault in a component coupled to the power supply system. The fault results in a drop in voltage of the generator output. The parameter that is measured may be, for example, the output voltage at the generator output or an AC frequency of the output voltage. The control system further includes a control unit configured to control the voltage setpoint for the output voltage of the generator based on the measured parameter. If the value of the parameter falls below a threshold, the voltage setpoint is reduced. The control unit is further configured to gradually increase the voltage setpoint back to the operating voltage setpoint after the fault is electrically isolated from the power supply system.

By lowering the voltage setpoint after a fault and bringing the voltage setpoint gradually back to normal, a voltage overshoot may be kept within acceptable limits or may even be prevented. By limiting the voltage overshoot, the tripping of and/or damage to other electrical components coupled to the power distribution bus of the marine vessel may be prevented. A reliable operation may thus be provided even if the bus tie breakers are closed and a fault occurs in the power system. Operation of the power system according to DP3 specifications with closed bus tie breakers may thus be achieved.

Electrically isolating the fault from the power supply system indicates that the fault is cleared. Isolation may occur, for example, by disconnecting the component having the fault from the power supply system. In some embodiments, the component having the fault may be disconnected from the power distribution bus. In some embodiments, a section of the power distribution bus in which the fault occurred may be disconnected from the remaining sections of the power distribution bus. In some embodiments, the cause of the fault may simply be removed if feasible. The disconnecting may occur via circuit breakers, bus tie breakers, relays, fuses, power electronics, or the like.

In some embodiments, the control systems may determine that a fault occurred (e.g., when the measured parameter falls below the threshold). The control systems may then control the voltage setpoint as described above. The control unit may simply control the voltage setpoint based on the measured parameter (e.g., in accordance with a predefined relationship) without explicitly determining the occurrence of a fault. Examples of faults include a short circuit in a component coupled to the power distribution bus, a short circuit in the power distribution bus itself (e.g., a bus bar fault), a generator interconnection cable fault, or the like. The fault may lead to a drop in voltage of the generator output after the occurrence of the fault. The operating voltage setpoint defines a voltage that the generator may deliver under normal operation. As such, the operating voltage setpoint may be varied during normal operation (e.g., operation without the presence of a fault).

In some embodiments, the gradual increase of the voltage setpoint is performed such that a voltage overshoot occurring after the return of the voltage setpoint to the operating voltage setpoint is less than 125%, in some embodiments less than 120%, of the operating voltage. With such a configuration of the control system, the DP3 specifications for operating the power system may be achieved.

In some embodiments, the parameter is the voltage at the generator output and the control unit is configured to determine that a fault in the power supply system or in components coupled to the power supply system exists if the voltage at the generator output drops below a voltage threshold. Due to the low impedances in the power system of a marine vessel, a fault in a component (e.g., a short circuit) will result in a substantial voltage drop. Thus, measuring the voltage at the output of the generator is a good indicator of the occurrence of a fault.

In some embodiments, the parameter is the AC frequency of the output voltage at the generator output and the control unit is configured to determine that a fault in the power supply system or in components coupled to the power supply system exists if the AC frequency at the generator output drops below a frequency threshold. A fault (e.g., a short circuit in one of the components) may lead to a large current being drawn from the generator of the power supply system. As a result, the load on the generator will increase. The increased load may result in a reduction of the shaft rotation speed of the generator and, therefore, a reduction in the frequency of the output voltage. Thus, the AC frequency at the generator output is a good indicator of the occurrence of a fault in the power system.

In some embodiments, the control unit is configured to set the voltage setpoint to a starting voltage setpoint after the detection of the fault and to ramp the voltage setpoint up to the operating voltage setpoint thereafter. By using a ramp to increase the voltage setpoint after a fault, the voltage overshoot may be kept low. The starting voltage setpoints may, for example, lie in a range of 0% to 50% of the operating voltage setpoint.

The ramping of the voltage setpoint from the starting voltage setpoint to the operating voltage setpoint may occur within a time period ranging from about 0.1 seconds to about 3 seconds and, in some embodiments, from about 0.5 seconds to about 2 seconds.

By ramping a starting voltage setpoint to the operating voltage setpoint, the current inrush to the electric motors connected to the power distribution bus may be substantially reduced. By using such a ramp, the tripping of consumers (e.g., the self-initiated shutdown of consumers) due to an overly low voltage may be prevented. In some embodiments, by making the duration of the ramp less than 3 seconds (e.g., in some embodiments, less than 2 seconds), a tripping of frequency converters of the thrusters drives due to the low voltage may be prevented. The tripping may occur when a kinetic energy recovery is no longer feasible if the voltage is reduced for too long of a duration.

For example, two ramps may be used: a first ramp starting at the starting voltage setpoint and extending to an intermediate voltage setpoint; and a second ramp starting at the intermediate voltage setpoint and extending to the operating voltage setpoint. The intermediate voltage setpoint may, for example, lie within a range of about 70% to about 90%, in some embodiments about 75% to about 85%, of the operating voltage setpoint. A fast recovery back to the normal operating voltage may thus be achieved while at the same time minimizing voltage overshoot.

In some embodiments, the control unit includes a protection controller and an automatic voltage regulator (AVR). The protection controller has an interface to the AVR and is configured to generate a control signal for controlling the voltage setpoint. The protection controller is further configured to supply the control signal to the AVR via the interface. The AVR is configured to determine the voltage setpoint from the supplied control signal and to control a field voltage of the generator based on the determined voltage setpoint. For example, the AVR may have an input that is used for a power system stabilizer. The protection controller may use the input to control the voltage setpoint, as described above. For example, the input may be an analogue voltage or a current input. The protection controller may, for example, provide a control signal that ramps up the voltage setpoint as described above, thereby minimizing voltage overshoot.

In some embodiments, the control unit includes an automatic voltage regulator (AVR), and the automatic voltage regulator includes a Volts-per-Hertz limiter. The Volts-per-Hertz limiter limits the voltage setpoint based on the AC frequency of the output voltage of the generator. A lower AC frequency results in a lower limit for the voltage setpoint. Thus, if the AC frequency drops due to the occurrence of a fault, the Volts-per-Hertz limiter will reduce the voltage setpoint and will gradually increase the voltage setpoint after the fault is cleared. Excessive inrush currents and voltage overshoot are thus preventable.

In some embodiments, the Volts-per-Hertz limiter may be configured such that the ratio of the voltage setpoint to the AC frequency remains below a predefined limit. If this limit is exceeded, the Volts-per-Hertz limiter reduces the voltage setpoint. For example, at the nominal AC frequency, the maximum voltage setpoint may be limited to between 105% and 120%, in some embodiments about 110%, of the operating voltage setpoint. This limitation defines a maximum ratio of the voltage setpoint to the AC frequency (e.g., a ratio of 1.1). The Volts-per-Hertz limiter may be configured to limit the voltage setpoint, such that this maximum ratio is not exceeded for all AC frequencies. Thus, if the AC frequency drops to 50% of the nominal AC frequency, the voltage setpoint may be limited to a maximum of 55% of the operating voltage setpoint.

In some embodiments, the AVR may be coupled to the protection controller and may include the Volts-per-Hertz limiter (e.g., the AVR may combine two of the above-described embodiments). The AVR may be configured to control the voltage setpoint based on the supplied control signal and, at the same time, to limit the voltage setpoint based on the AC frequency of the output voltage of the generator via the Volts-per-Hertz limiter. A double protection against voltage overshoot may thus be achieved. For example, if the protection controller fails, the Volts-per-Hertz limiter may still reduce voltage overshoot to an acceptable level.

In some embodiments, a power system of a marine vessel (e.g., an offshore platform or a drilling or production vessel) is provided. The power system includes a plurality of power supply systems in any of the above-described configurations, and a power distribution bus divided into several sections. Each section of the power distribution bus is coupled to at least one power supply system. The sections are connectable by bus tie breakers, and the power distribution bus is configured to supply electric power generated by the power supply systems to a plurality of electric motors coupled to the power distribution bus. By using power supply systems as described above, a voltage overshoot may be prevented after a section of the power distribution bus is disconnected and the system is powered up again.

In some embodiments, each of the power supply systems is configured to limit a voltage overshoot occurring after a fault to less than 125%, in some embodiments less than 120%, of the nominal operating voltage of the respective power supply system. In some embodiments, the fault has occurred in one of the power supply systems, the distribution bus, or components coupled thereto. The limitation of the voltage overshoot occurs by the above-described gradual increasing of the voltage setpoint after electrically isolating the fault from the power supply systems.

After the detection of the fault, the power system may be configured to open the bus tie breakers of the section of the power distribution bus in which the fault occurred, thereby isolating the fault from the power supply systems coupled to the remaining sections of the power distribution bus. Thus, the remaining power supply systems may return to normal operation without causing excessive voltage overshoot.

The sections of the power distribution bus may be connected in a ring configuration. Thus, even if a section is disconnected from the power distribution bus, the remaining sections stay connected with each other. By using the ring configuration with closed bus tie breakers, the number of generators used to go online (e.g., to deliver power to the power distribution bus) may be limited. Furthermore, when several generators are being operated, the load may be shared between these generators. Thus, the generators may operate in efficient operating ranges even if the generators are connected to different bus sections.

In some embodiments, the marine vessel is a dynamically positioned vessel.

The power system may be a dynamically positioning equipment class 3 power system having a class 3 mode of operation. For example, the power system may be divided into several physically separate compartments (e.g., each compartment including a section of the power distribution bus). The power system may be configured such that loss of position does not occur from any single failure including burning or flooding of any compartment. A class 3 mode of operation refers to a mode of operation that does not meet this requirement. The power system may also be operable in other modes that have less stringent requirements for failure protection.

In some embodiments, the power system is configured to operate in the class 3 mode of operation with the bus tie breakers closed between the sections of the power distribution bus. By using the power supply systems configured as described above, the voltage overshoot may be reduced to levels that permit a class 3 mode of operation with closed bus tie breakers. In some embodiments, the propagation of a fault from one compartment to another is prevented. Thus, the stringent requirements for fail safe operation may be met even when the bus tie breakers are closed.

In some embodiments, a method of operating a power supply system of a marine vessel is provided. The power supply system is coupled to a power distribution bus of the marine vessel and is configured to power a plurality of electric motors coupled to the power distribution bus. The power supply system includes a generator and a control system configured to control the output voltage of the generator based on a voltage setpoint. The method includes operating the power supply system with the voltage setpoint set to an operating voltage setpoint. The method further includes measuring a parameter of the electric power generated by the generator. The parameter may be indicative of a fault in a component coupled to the power supply system that results in a drop in voltage of the generator output. The method further includes reducing the voltage setpoint for the output voltage of the generator if the value of the parameter falls below a threshold and, after the fault is electrically isolated from the power supply system, gradually increasing the voltage set point back to the operating voltage set point. With such methods, advantages similar to those described above with respect to power supply systems may be achieved.

In some embodiments, the method further includes detecting a fault in a component coupled to the power supply system by detecting a drop in the output voltage of the generator below a voltage threshold or by detecting a drop in the AC frequency of the output voltage of the generator below a frequency threshold. The method may further include isolating the fault by opening bus tie breakers of a section of the power distribution bus in which the fault occurred, thereby electrically isolating the fault from the power supply system. Electrical isolation of the fault may also occur by disconnecting the component that causes the fault from the power distribution bus (e.g., by a corresponding circuit breaker, relay, or the like).

Methods in accordance with the present teachings may be carried out using a power supply system in any of the above-described configurations. In some embodiments, any acts involved in a method described above with respect to embodiments of a power supply system may likewise be implemented in a method of operating a power supply system of a marine vessel.

Unless noted to the contrary, elements and features of the various representative embodiments described above and below may be combined in different ways to produce new embodiments that likewise fall within the scope of the present teachings.

BRIEF DESCRIPTION OF THE DRAWINGS

In the drawings, like reference numerals refer to like elements.

FIG. 7 is a diagram illustrating an example of voltage overshoot after the occurrence of a 500 ms fault.

DETAILED DESCRIPTION

Figure 1:
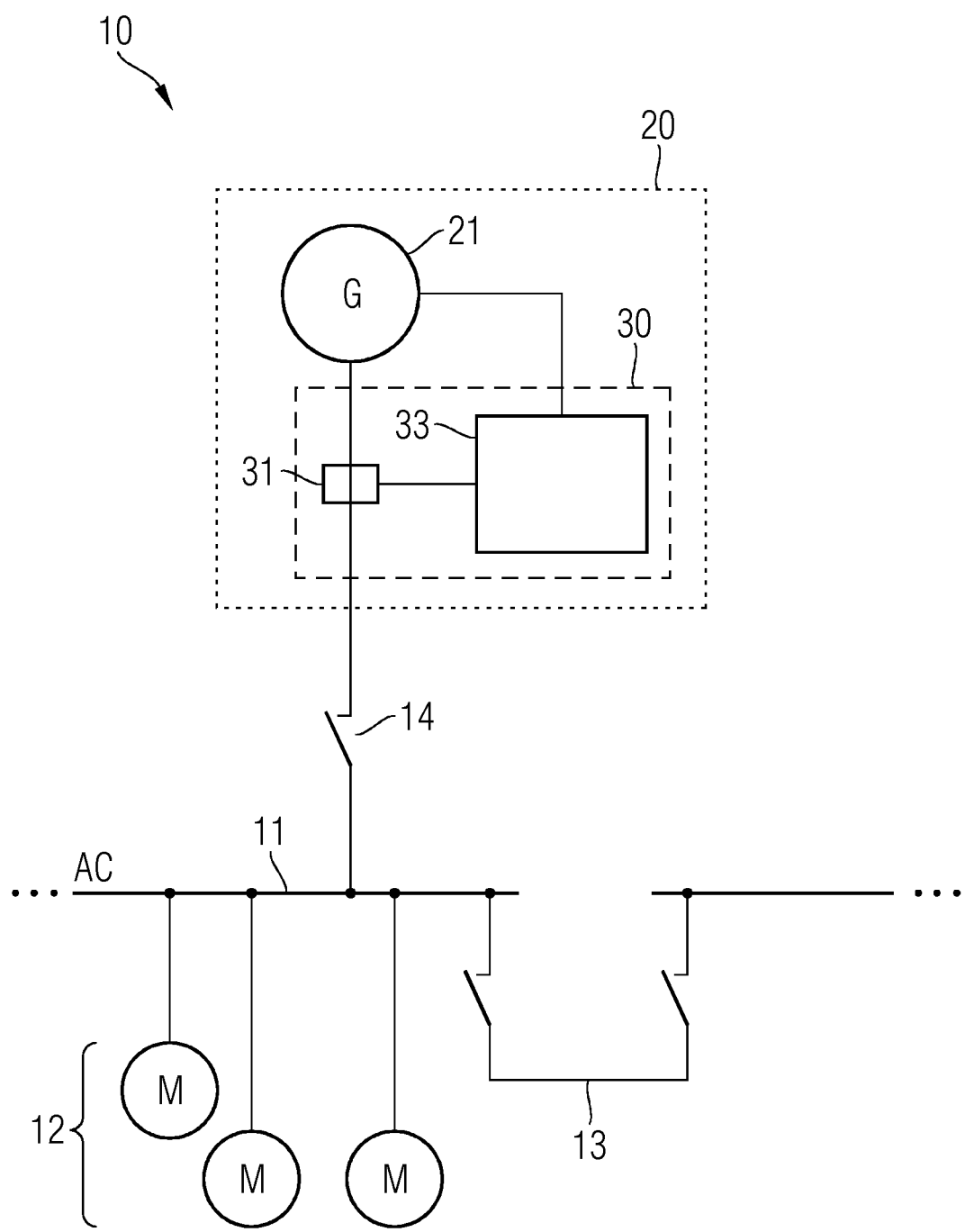
FIG. 1 is a schematic block diagram illustrating an exemplary power supply system in accordance with the present teachings.

In the following description, embodiments in accordance with the present teachings will be described in detail with reference to the accompanying drawings. It is to be understood that the following description is provided solely for the purpose of illustration and is not to be taken in a limiting sense.

It should be noted that the drawings are to be regarded as being schematic representations only, and that elements in the drawings are not necessarily to scale with each other. Rather, the representation of the various elements is chosen such that the function and general purpose of these elements become apparent to a person of ordinary skill in the art. It is further to be understood that the coupling of physical or functional units as shown in the drawings and as described hereinafter does not necessarily correspond to a direct connection of coupling, but may also be an indirect connection or coupling (e.g., a connection or a coupling with one or more additional intervening elements, such as fuses, circuit breakers, transformers, or the like). A skilled artisan will further appreciate that the physical or functional units illustrated and described herein with respect to different embodiments may not necessarily be implemented as physically separate units. One or more physical or functional blocks or units may be implemented in a common circuit, chip, circuit element or unit, while other physical or functional blocks or units may be implemented in separate circuits, chips, circuit element, or units.

FIG. 1 schematically illustrates a power system 10 of a marine vessel. The power system 10 includes a power supply system 20 that provides electric power for operating the marine vessel. The power supply system 20 is coupled to a power distribution bus 11 of the marine vessel via a circuit breaker 14. The power distribution bus 11 includes several sections. Two sections are shown in FIG. 1. In operation, the different sections of the power distribution bus 11 are coupled via bus tie breakers 13. Loads that are supplied with electric power by the power distribution bus 11 include electric motors 12. Electric motors 12 may be part of drives (e.g., a drilling drive, a thruster drive or draw works, and may also include auxiliary electric motors (e.g., for operating pumps, compressors, or the like). In some embodiments, the electric motors 12 may include direct online (DOL) induction motors.

The power supply system 10 of the marine vessel is configured to operate in several different operation modes including a DP2 (dynamic positioning 2) mode and a DP3 (dynamic positioning 3) mode. The requirements of these operation modes are defined by DNV (Det Norske Veritas). Meeting the DP3 requirements may result in a "DYNPOS AUTRO" classification of the marine vessel.

The DP2 mode may, for example, be used during transit when the requirements regarding tripping of consumers (e.g., disconnecting the consumers from the power system) are not strict. The vessel may be operated in the DP3 mode, for example, during drilling operations to provide a stable position above the drilling site. Accordingly, requirements regarding integrity of the power system are strict for the DP3 mode of operation. In some embodiments, to meet DP3 specifications, the power distribution bus may be split into several sections. Each of the sections is powered by an individual power supply system 20. This configuration may be achieved by opening all the bus tie breakers 13. When a fault occurs, the fault will be isolated in the subsection of the power distribution bus 11 and will not affect the remaining sections, thereby facilitating safe operation of the marine vessel. Two, three, or four redundant subsections may be provided, thereby providing a high degree of redundancy. In the DP2 mode, integrity and reliability requirements are not high, such that the power distribution bus 11 may be operated with bus tie breakers 13 closed.

When bus tie breakers 13 are closed and a fault occurs (e.g., due to a fault on the power distribution bus 11, a bus bar fault, or a generator interconnection cable fault), the voltage on the power distribution bus 11 will drop. During the voltage drop, the motors 12 (including DOL motors that may be connected through transformers to low voltage feeders) lose power and, therefore, may operate under a substantially reduced current supply. The motors will consequently start reducing speed depending on the load torque curve and motor inertia. The power system 10 may include tens or hundreds of such small DOL motors. As a result, predicting the overall system behavior of a power system 10 in the case of a fault is difficult.

After the fault is cleared (e.g., by disconnecting the component causing the fault from the power system 10, or by isolating a section of the power distribution bus 11, such as by opening the corresponding bus tie breakers 13), the motors 12 will increase speed back to nominal. The increase may result in an inrush current that is substantial.

For providing the operating voltage on the power distribution bus 11, the power supply system 20 includes a generator 21. The generator 21 may be coupled to a diesel engine or a gas turbine, and is controlled by a control system 30 interfacing the generator 21. The control system 30 endeavors to bring the voltage on power distribution bus 11 back to the normal operating voltage (e.g., to 100% of the nominal voltage). For such a purpose, the control system 30 may include an automatic voltage regulator (AVR). In conventional power supply systems of marine vessels, a fault will result in the occurrence of a voltage overshooting that may be higher than about 140 to 150% of the nominal operating voltage. Since such high voltage overshoot may cause tripping of and/or damage to other electrical components connected to the power distribution bus 11 of the marine vessel, the bus tie breakers 13 are opened during operation in DP3 mode. Thus, if such voltage overshoot occurs in one section of the power distribution bus 11, the other sections are unaffected. The tripping of essential consumers (e.g., navigational equipment) may thus be avoided. For example, if a 150% voltage overshoot occurs, a consumer operating on nominal 230 V AC may sense 350 V AC for several seconds, thereby resulting in breaking or opening of fuses or breakers, or damage to the equipment.

In the embodiment shown in FIG. 1, the power supply system 20 is configured to minimize the voltage overshoot occurring after a fault to less than 125% of the nominal operating voltage, in some embodiments to even less than 120% of the nominal operating voltage. For this purpose, the control system 30 includes a measuring unit 31 that measures a parameter of the electric power generated by generator 21 (e.g., the output voltage of the generator 21 or the AC frequency of the output voltage). Occurrence of a fault will result in a drop in the voltage of the output of generator 21. By measuring the parameter, the voltage drop may be sensed. Alternatively, since the generator will slow down in the attempt to bring the voltage back up to nominal, a drop in the AC frequency of the output voltage may indicate the fault.

The control system 30 includes a control unit 33 that adjusts the output voltage of generator 21 by controlling the voltage/current of a field coil of generator 21 based on a voltage setpoint. In normal operation, the voltage setpoint is set to an operating voltage setpoint, such that the generator 21 provides the nominal operating voltage at its output.

The control unit 33 is configured to control the voltage setpoint for the output voltage of the generator 21 based on the parameter measured by the measuring unit 31. If the value of the parameter falls below a threshold, thus indicating the occurrence of a fault, the voltage setpoint is reduced. The control unit 33 may detect the fault and set the voltage setpoint to a predefined lower value. Alternatively, the control unit 33 may provide a predefined relationship between the measured parameter and the voltage setpoint, such that a drop in the parameter automatically results in a drop in the voltage setpoint.

The control unit 30 is further configured to gradually increase the voltage setpoint back to the operating voltage setpoint after the fault is electrically isolated from the power supply system. The control unit 33 may increase the voltage setpoint according to a predefined procedure. Alternatively, the control unit 33 may provide a relationship between the measured parameter and the voltage threshold, such that if the measured parameter returns back to normal, the voltage setpoint also returns back to the operating voltage setpoint.

As a result, since the voltage setpoint is first lowered and then gradually increased back to the operating voltage setpoint, voltage overshoot may be substantially reduced. In some embodiments, the gradual increase may be selected such that the voltage overshoot is limited to less than 125%, in some embodiments less than 120%, of the nominal operating voltage. In such a configuration, the power system 10 may be operated with closed bus tie breakers 13 even in the DP3 mode of operation. The power supply system 20 will prevent the voltage overshoot to exceed DP3 specifications.

Figure 2:
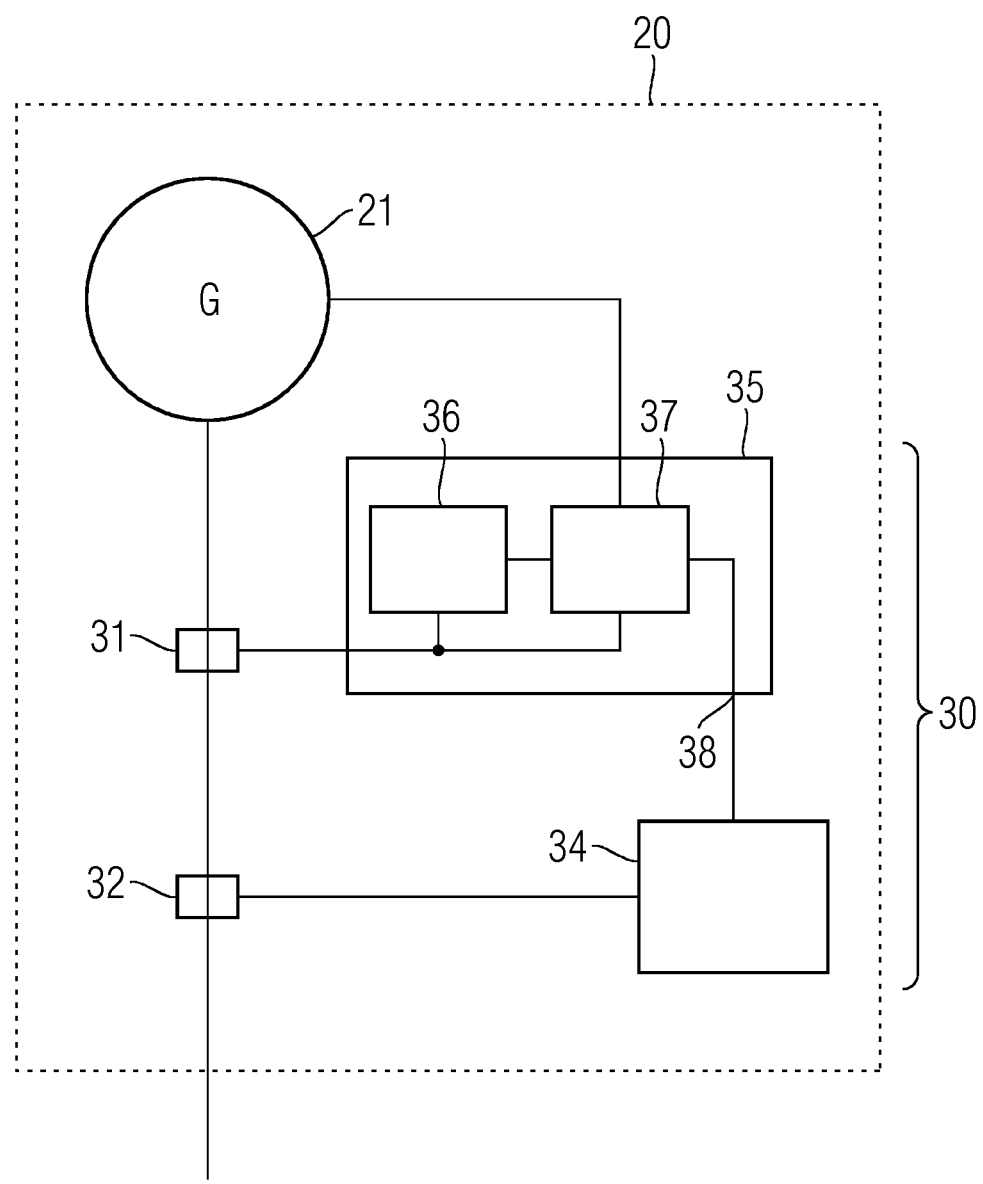
FIG. 2 is a schematic block diagram illustrating an exemplary configuration of the power supply system of FIG. 1.

FIG. 2 shows an embodiment of the power supply system 20 that may be used in the power system 10 of FIG. 1. The control system 30 of the power supply system 20 is implemented by an automatic voltage regulator (AVR) 35 and a protection controller 34. The AVR 35 may implement the functionality of any conventional automatic voltage regulator. The configuration of the AVR 35 may be chosen based on the type of generator 21 and the power requirements of the power supply system 20. The AVR 35 interfaces the measuring unit 31. The measuring unit 31 may be implemented, for example, as a voltage- and/or power-sensing circuit. The measuring unit 31 may further include a frequency-sensing circuit configured for measuring the AC frequency of the AC voltage generated by the generator 21. The measurement unit 31 itself may not determine the AC voltage or the AC frequency of the output voltage. The measurement unit 31 may, for example, simply be used to sample voltage values over time at measurement points on the generator output. An RMS value of the output voltage may be determined from a sequence of measurement values. The frequency of the output voltage may be determined (e.g., by using a Fourier transform). The determination may be performed in the AVR 35. In some embodiments, the output voltage of the generator 21 may be measured at a stator winding. In some embodiments, the output voltage of the generator 21 may be measured in an auxiliary winding.

The AVR 35 includes a voltage controller 37 that uses the voltage sensed by the measuring unit 31 at the output of the generator 21 for voltage control purposes. In some embodiments, the voltage control unit 37 controls the voltage or power fed to the exciter field of the generator 21, thereby controlling the output voltage of the generator. In operation, an operating voltage setpoint is defined in the AVR 35, and the voltage controller 37 adjusts the field voltage such that the voltage output of the generator 21 corresponds to the operating voltage setpoint. Closed loop control of the output voltage of the generator 21 may thus be achieved. The AVR 35 may compensate for load, speed, temperature, power factor, and the like of the generator 21.

In the embodiment shown in FIG. 2, the AVR 35 is provided with a Volts-per-Hertz limiter 36. The Volts-per-Hertz limiter 36 limits the voltage setpoint of the AVR 35 based on the AC frequency of the output voltage of the generator 21. This limitation may occur in accordance with a characteristic curve that is defined in the Volts-per-Hertz limiter 36.

Figure 6:
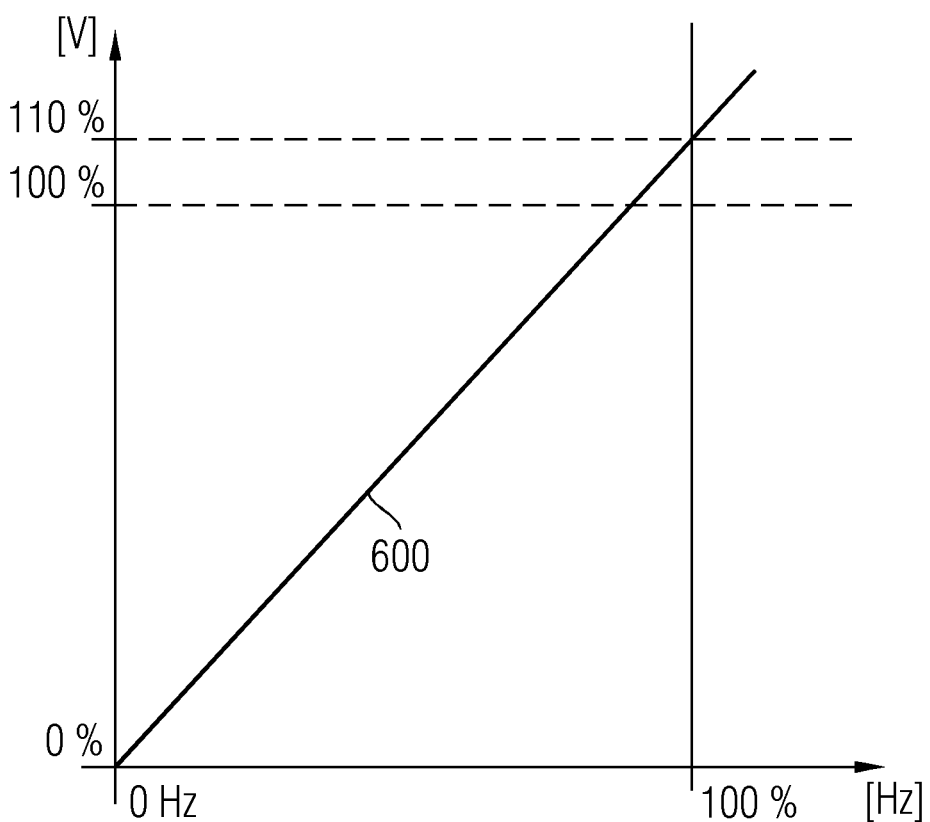
FIG. 6 is a diagram illustrating an example of the voltage setpoint limit based on AC frequency for an exemplary Volts-per-Hertz limiter in accordance with the present teachings.

FIG. 6 shows an example of such a characteristic curve. The X-axis of the plot in FIG. 6 shows the AC frequency at the generator output in units of Hz, whereas the Y-axis shows the output voltage of the generator. Under normal operating conditions, the output voltage will have a nominal AC frequency (100%) and the nominal output voltage value (100%). The line 600 illustrates a fixed V/Hz ratio that limits the maximum voltage setpoint based on the actual AC frequency of the output voltage (e.g., a fixed ratio of 1.1 in the example of FIG. 6). Accordingly, if the AC frequency drops, for example, to 50%, the maximum voltage setpoint is limited to 55%. Using a fixed ratio results in a straight line such as the line 600 shown in the plot of FIG. 6. In some embodiments, a ratio may be used that changes with generator frequency. This changing ratio would result in a characteristic curve in the plot of FIG. 6.

The maximum Volts-per-Hertz ratio (e.g., the line 600 in FIG. 6) effectively provides a frequency threshold to the AC frequency of the output voltage. If the AC frequency drops below this threshold (e.g., if line 600 is crossed in a negative X-direction), the voltage setpoint is reduced so that operation of the system continues in the region below line 600. Similarly, if the AC frequency increases, the voltage setpoint may be increased to the limit given by the Volts-per-Hertz ratio (e.g., the line 600).

As shown in FIG. 2, the measurement unit 31 includes a frequency measuring circuit (e.g., that may be implemented as described above). The measurement unit 31 provides the frequency of the output voltage to the Volts-per-Hertz limiter 36. The Volts-per-Hertz limiter 36 then provides the maximum allowable voltage set point to the voltage controller 37. The voltage controller 37 reduces the voltage setpoint based on the limit and controls the field voltage accordingly.

If a fault were now to occur in the power system, the current being drawn from the power supply system 20 will increase, thereby resulting in a voltage drop at the output of generator 21, a reduced rotational frequency of the generator 21, and a reduced AC frequency of the output voltage. The Volts-per-Hertz limiter 36 detects the reduction and reduces the voltage setpoint accordingly. When the fault is cleared from the system, the generator will pick up speed again, thereby resulting in an increasing AC frequency of the output voltage and a corresponding increase in the maximum allowable voltage setpoint. The voltage setpoint thus gradually increases back to the normal operating voltage setpoint, such that voltage overshooting may be kept small.

In addition to, or as an alternative for, operating the Volts-per-Hertz limiter 36, the control system 30 of the power supply system 20 may include a protection controller 34. The protection controller 34 interfaces an input 38 of the automatic voltage regulator 35. The protection controller 34 controls the voltage setpoint of the AVR by the voltage regulator 35. The protection controller 34 interfaces the measurement unit 32 that includes voltage sensing circuits for sensing the output voltage of the generator 21. A single measurement unit (e.g., substituting for the measurement units 31 and 32) is sufficient. The single measurement unit provides measurements of the parameter indicative of the fault to both the AVR 35 and the protection controller 34.

The input 38 may be an analogue input, and the protection controller 34 may provide an analogue control signal to the AVR 35 to indicate a change in the voltage setpoint. For example, an analogue voltage (e.g., in a range between −10 V and +10 V DC) or a current (e.g., in a range of 4 mA to 20 mA) may be used as the control signal. The protection controller 34 monitors the measured output voltage. If the output voltage drops below a voltage threshold, the protection controller 34 identifies the occurrence of a fault. The protection controller 34 controls the voltage setpoint to a starting voltage setpoint by the control signal. For example, the starting voltage setpoint may lie in a range of between about 0% and about 50% of the operating voltage setpoint. After clearance of the fault, the protection controller 34 ramps up the voltage setpoint back to the operating voltage setpoint. The ramping may have a duration of between about 0.1 seconds and about 3 seconds, in some embodiments between about 0.5 seconds and about 2 seconds. The inrush current to the motors 12 coupled to the power system may thus be reduced, and tripping due to an overly low voltage (e.g., when the voltage is increased too slowly) of other components coupled to the power system may be prevented. An example is a thruster frequency converter that may disconnect since kinetic energy recovery may no longer be achieved if the voltage is reduced for too long of a duration.

In addition to using a single ramp from the starting voltage setpoint to the operating voltage setpoint, the ramping may be made more complex in order to reduce the amount of time to return to the operating voltage setpoint while, at the same time, minimizing voltage overshoot. For example, a first ramp may be used for ramping up the voltage setpoint to between about 75% and about 85% of the operating voltage setpoint. A second ramp may be used for returning the voltage setpoint from this intermediate voltage setpoint to the operating voltage setpoint. The first ramp is configured to have a slope that is steeper than the slope of the second ramp, thereby minimizing the time for recovery and, at the same time, reducing voltage overshoot.

In some embodiments, the protection controller detects the occurrence of a fault if the output voltage drops below 20% or, in some embodiments, below 10%. After clearance of the fault, the protection controller will then start a soft ramp-up of the voltage setpoint from 10% to 100% within 2 seconds. This exemplary configuration was used for obtaining the results shown in FIG. 9 that are described below. Since the duration of the fault is comparatively short (e.g., below 0.5 seconds), the ramp may be started directly after detection of the fault, thereby resulting in the largest part of the ramp occurring after fault clearance. Alternatively, the ramp may start only after detection of the clearance of the failure (e.g., output voltage rising again, or rising above a threshold voltage).

In the configuration shown in FIG. 2, both the Volts-per-Hertz limiter 36 and the protection controller 34 are used at the same time. After a fault, the voltage setpoint is controlled by the protection controller 34, as described above. If the protection controller fails, the Volts-per-Hertz limiter 36 will still provide a limit to the voltage setpoint, such that even in this case, voltage overshoot is substantially reduced. In other embodiments, only one of the Volts-per-Hertz limiter 36 and the protection controller 34 may be used. If only the Volts-per-Hertz limiter 36 is used, only the voltage measurements/frequency measurements taken by the AVR are used and no additional controller has to be implemented. On the other hand, if only the protection controller 34 is used, even lower voltage overshooting may be achieved, and the ramping up of the voltage setpoint may be optimized to achieve fast recovery and minimal voltage overshoot. Using both the Volts-per-Hertz limiter 36 and the protection controller 34 at the same time provides redundancy and keeps the system operational even if one device fails.

Figure 3:
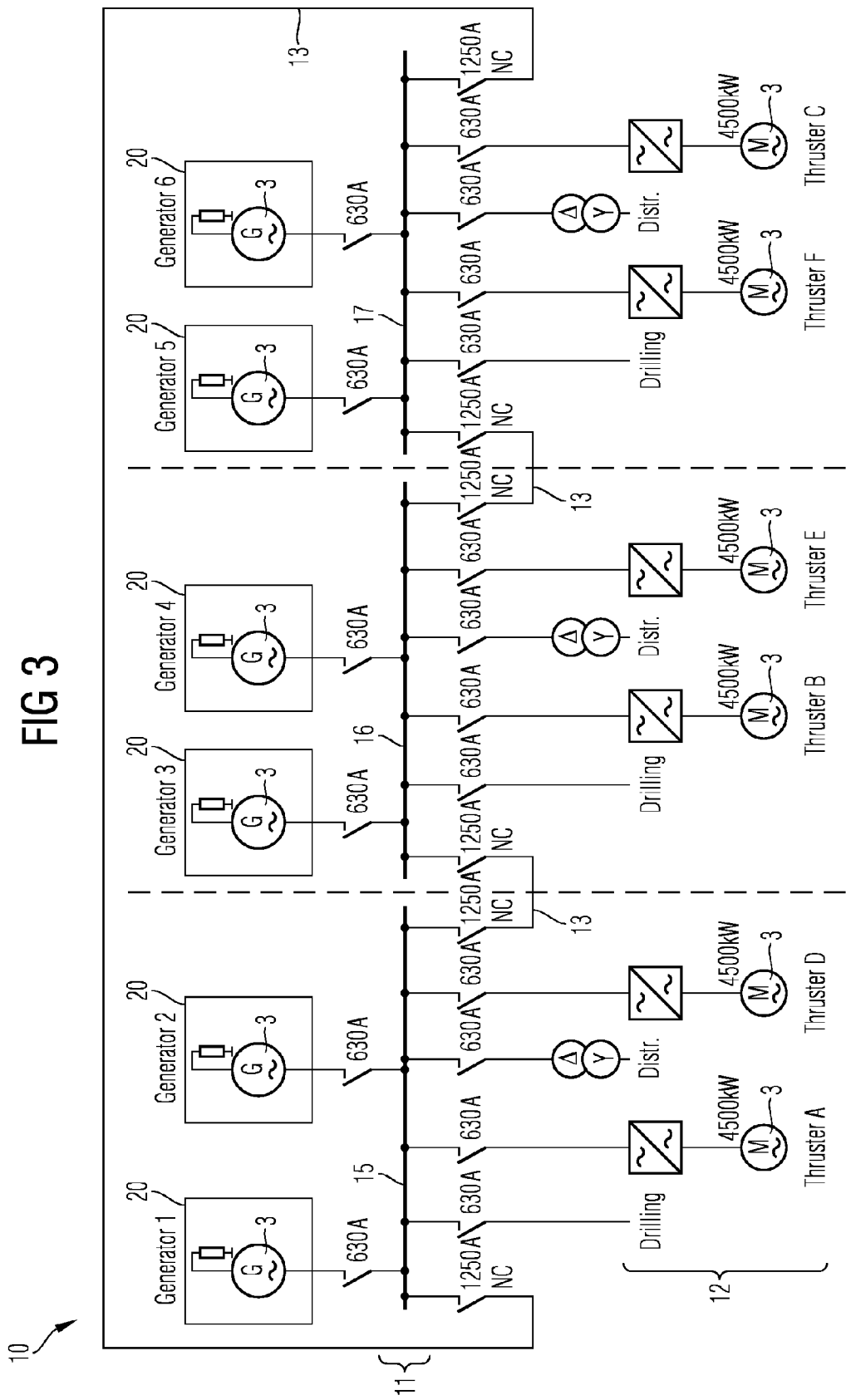
FIG. 3 is a schematic block diagram illustrating an exemplary power system in accordance with the present teachings that may include the power supply system of FIG. 1 or 2.

In FIG. 3, an exemplary implementation of the power system 10 is schematically illustrated. The power system 10 of FIG. 3 may use any of the configurations of the power supply system 20 described above. Accordingly, any of the description provided above equally apply to the power system 10 shown in FIG. 3. The power supply systems 20 are coupled to the power distribution bus 11 via circuit breakers. The power supply systems 20 may be electrically isolated from the power distribution bus 11 in case of a fault in the respective power supply system. The power distribution bus 11 includes first section 15, second section 16, and third section 17. Two power supply systems 20 are coupled to each of first section 15, second section 16, and third section 17. The sections are interconnected via bus tie breakers 13. The power distribution bus 11 thus has a ring configuration. Furthermore, loads/consumers including the electric motors 12 are coupled to the power distribution bus 11 via circuit breakers, so that the loads/consumers may be electrically isolated from the power distribution bus 11 in the case of a fault.

As indicated by the dashed lines in FIG. 3, the generators coupled to each section of the power distribution bus are operating in their own individual engine rooms. These individual engine rooms are segregated by a firewall and watertight separation from the other engine rooms. If there is a fault in one section of the power distribution bus (e.g., on the main power system bus bars or bus tie cables), the whole section of the power distribution bus 11 may be decoupled from the remaining sections, thereby electrically isolating the fault from the remaining sections of the power distribution bus 11. By using the power supply systems 20 configured in accordance with the present teachings, the bus tie breakers 13 may be closed during DP3 operation. After the occurrence of a fault, voltage overshoot when the power system resumes normal operation is minimized.

Figure 4:
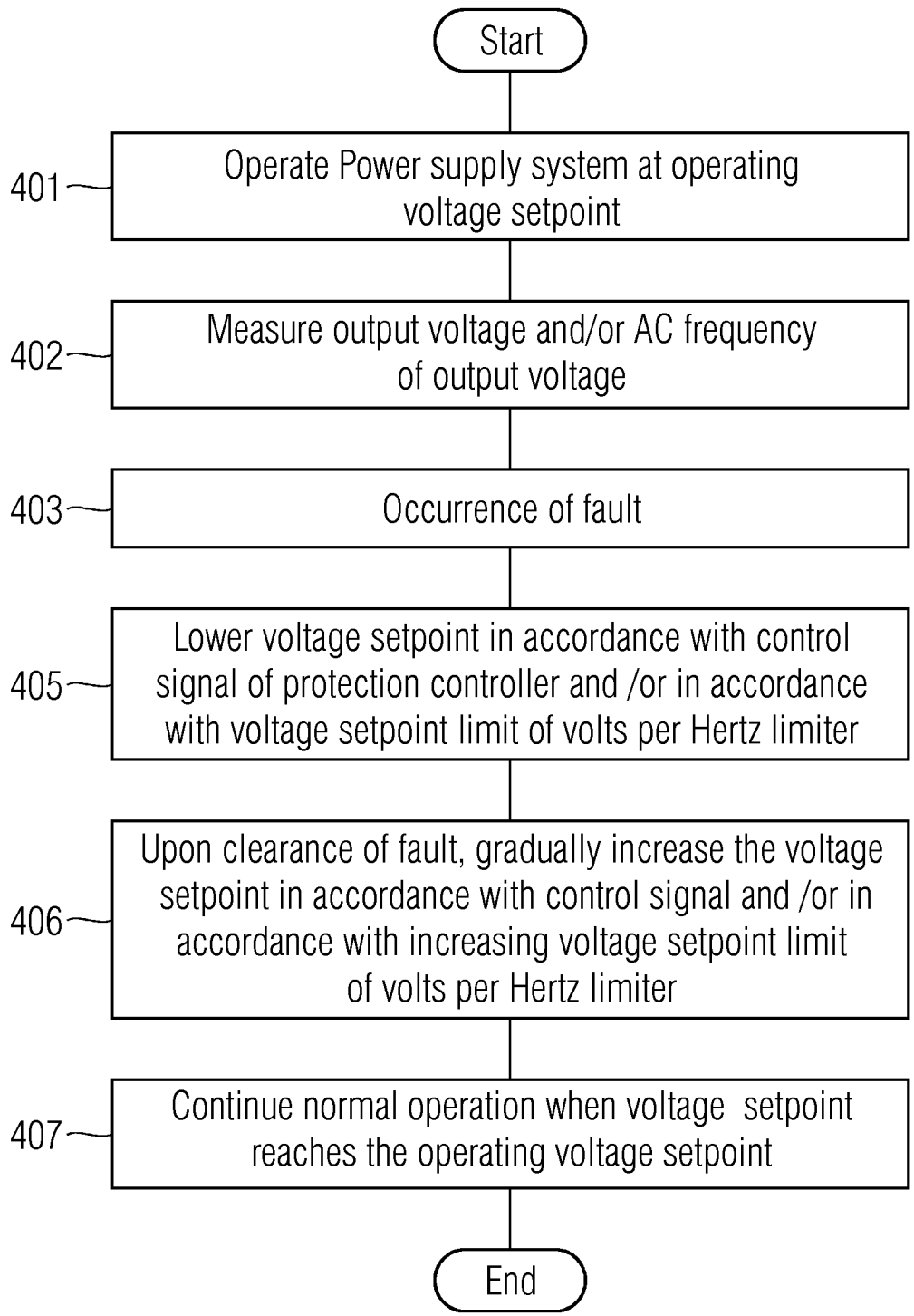
FIG. 4 is a flow diagram of an exemplary method of operating a power supply system of a marine vessel in accordance with the present teachings.

The exemplary method illustrated in the flow diagram of FIG. 4 may be performed on any of the power supply systems or power systems described above. In a first act 401, the power supply system 20 is operated at the operating voltage setpoint. In act 402, the output voltage and/or the AC frequency of the output voltage is measured (e.g., by voltage- and frequency-measuring circuitry, by sampling the voltage at points in time and analyzing the sampled signal, or the like, as described above). In act 403, a fault occurs in the power system. As described above, the fault will be recognized as a drop in the monitored parameter (e.g., a drop in voltage or frequency at the output of the generator). In act 405, the voltage setpoint of the control system is lowered (e.g., based on the control signal of the protection controller or based on a voltage setpoint limit of the Volts-per-Hertz limiter). As described above, both types of overshoot protection may be operated simultaneously with one serving as a backup for the other.

After clearance of the fault, the voltage setpoint is gradually increased either based on the control signal from the protection controller or on an increasing voltage setpoint limit of the Volts-per-Hertz limiter (act 406). When the voltage setpoint reaches the operating voltage setpoint that the power supply system 20 operates at under normal conditions, normal operation is resumed (act 407). The voltage setpoint is no longer limited by the Volts-per-Hertz limiter or the protection controller but is controlled based on operating conditions by the AVR.

Figure 5:
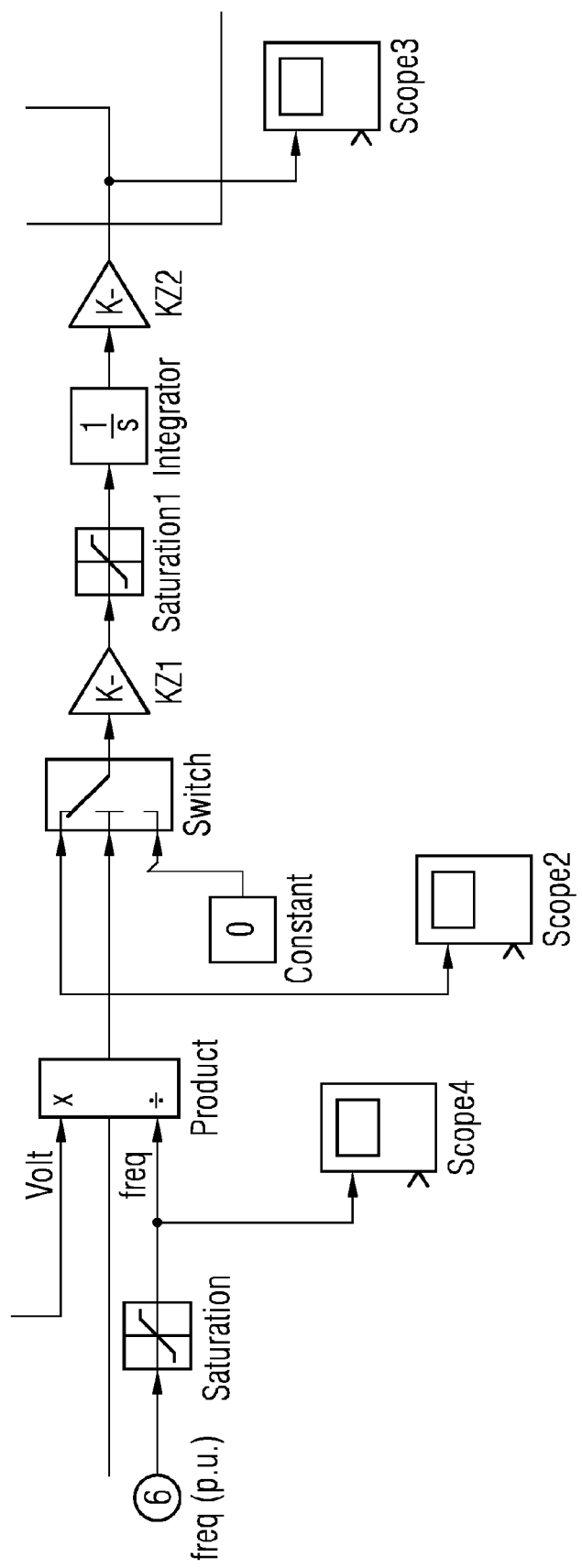
FIG. 5 is a schematic block diagram illustrating an exemplary implementation of a Volts-per-Hertz limiter that may be used in a power supply system in accordance with the present teachings.

FIG. 5 is a block diagram schematically illustrating exemplary implementation of a Volts-per-Hertz limiter. FIG. 5 provides only a schematic drawing. The illustrated implementation may be used for simulating the output of a Volts-per-Hertz limiter, and may or may not reflect actual setup of the Volts-per-Hertz limiter 36.

Figure 8:
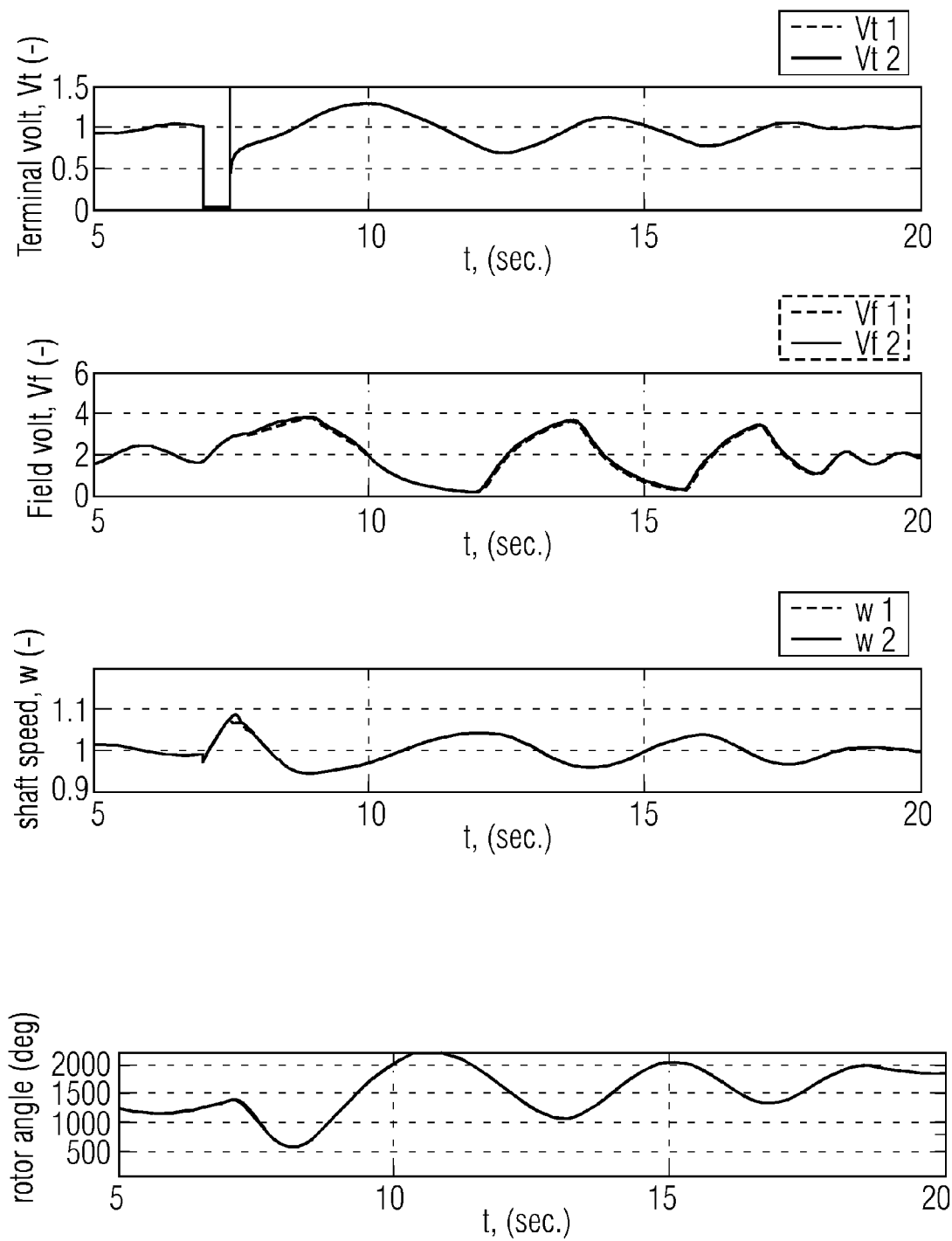
FIG. 8 is a diagram illustrating an example of voltage overshoot after a 500 ms fault when the voltage setpoint is reduced using a Volts-per-Hertz limiter.
Figure 9:
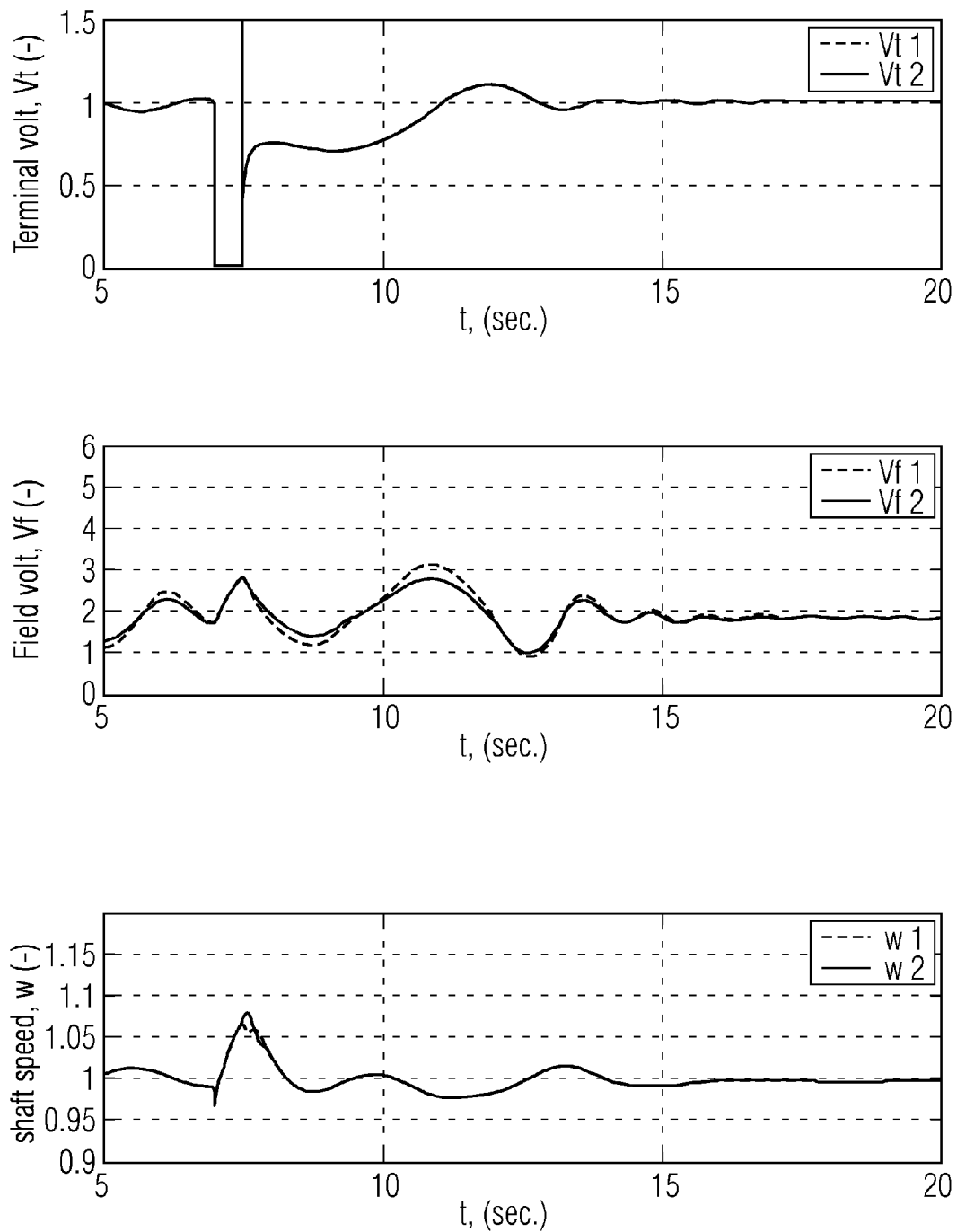
FIG. 9 is a diagram illustrating an example of voltage overshoot after a 500 ms fault when the voltage setpoint is reduced by using a control signal of a protection controller.

The diagrams in FIGS. 7 to 9 show results of a simulation of the reaction of the power supply system 20 to the occurrence of a fault in the power system in different configurations of the power supply system 20. The simulations were obtained by using MATLAB® SIMULINK®. The simulations of the Volts-per-Hertz limiter configuration in FIG. 8 were obtained using a configuration similar to the configuration shown in FIG. 5.

In FIG. 7, the reaction to a fault (e.g., a short circuit) of a duration of 500 ms is shown for a system that does not use the any voltage setpoint limitation. As may be seen, at the occurrence of the fault, the terminal voltage at the generator output drops significantly. After removal of the fault after 500 ms, the voltage starts to increase again (upper diagram). The voltage is controlled by an AVR without a Volts-per-Hertz limiter and without a protection controller. The terminal voltage is the voltage measured at the output of the generator. The diagram in the middle of FIG. 7 illustrates the field voltage. The field voltage is the parameter controlled by the AVR and is a measure of the power fed to the exciter field of the generator. As may be seen, after the occurrence of the fault, the AVR attempts to bring the terminal voltage back up to nominal, thereby increasing the field voltage. As shown in the upper diagram of FIG. 7, the increase in field voltage leads to a substantial overshoot (e.g., more than 140% of the operating voltage in the present case). The lower diagram in FIG. 7 shows that the shaft speed of the generator, which drops after the occurrence of the fault, increases to values near its nominal operating speed as the field voltage is increased.

In the diagram in FIG. 8, a Volts-per-Hertz limiter is implemented and operating in the AVR analogous to the configuration shown in FIG. 2. The second diagram from the top in FIG. 8 shows that after the 500 ms fault, the field voltage is increased more slowly than in FIG. 7 since the Volts-per-Hertz limiter limits the voltage setpoint. Consequently, the overshoot is reduced, as may be seen in the upper diagram in FIG. 8. The overshoot is less than 130% of the nominal operating voltage.

Similar to FIGS. 7 and 8, FIG. 9 shows the response of the power supply system to a fault of 500 ms duration. In FIG. 9, the control system implements a protection controller that slowly ramps up the voltage setpoint after the occurrence and clearance of the fault. As may be seen from the field voltage diagram, the field voltage is not as excessively increased as in FIG. 7. Rather, the field voltage decreases and slowly increases after the occurrence of the fault. Consequently, the voltage overshoot is minimized. The voltage overshoot is less than 120% of the nominal operating voltage in the present case.

In summary, by configuring the control system to gradually increase the voltage setpoint after the occurrence of a fault, voltage overshooting may be reduced, thereby improving voltage stability on marine vessels. Implementing both a Volts-per-Hertz limiter and a protection controller provides redundancy in the case of a blackout of one of the systems. The enhanced voltage stability reduces the risk of vessel blackout and position loss. Since voltage transients are reduced after a fault, components coupled to the power system may further benefit from an extended lifetime.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding claim—whether independent or dependent—and that such new combinations are to be understood as forming a part of the present specification.

The invention claimed is:

1. A power supply system configured to couple to a power distribution bus of a marine vessel and to power a plurality of electric motors coupled to the power distribution bus, the power supply system comprising:

a generator configured to generate electric power and to provide, in operation, an output voltage at an output of the generator, the output voltage being an AC voltage; and a control system coupled to the generator and configured to control the output voltage of the generator based on a voltage setpoint, wherein the voltage setpoint, in operation, is set to an operating voltage setpoint;

wherein the control system comprises:

a measuring unit configured to measure a parameter of the electric power generated by the generator, wherein a fault in a component coupled to the power supply system that results in a drop in voltage of the output of the generator is determinable based on the measured parameter; and a control unit configured to control the voltage setpoint for the output voltage of the generator based on the measured parameter, such that if a value of the parameter falls below a threshold, the voltage setpoint is reduced;

wherein the control unit is further configured to gradually increase the voltage setpoint back to the operating voltage setpoint after the fault is electrically isolated from the power supply system, thereby limiting voltage overshoot and preventing tripping of electrical components coupled to the power distribution bus of the marine vessel.

2. The power supply system of claim 1, wherein the parameter is the output voltage at the output of the generator, and wherein the control unit is further configured to determine that a fault in the power supply system or in components coupled thereto exists if the output voltage at the output of the generator drops below a voltage threshold.

3. The power supply system of claim 1, wherein the parameter is the AC frequency of the output voltage at the output of the generator, and wherein the control unit is further configured to determine that a fault in the power supply system or in components coupled thereto exists if the AC frequency at the output of the generator drops below a frequency threshold.

4. The power supply system of claim 1, wherein the control unit is further configured to set the voltage setpoint to a starting voltage setpoint after the fault is determined, and to increase the voltage setpoint to the operating voltage setpoint thereafter.

5. The power supply system of claim 4, wherein the increase in the voltage setpoint from the starting voltage setpoint to the operating voltage setpoint occurs within a time period of between about 0.1 seconds and about 3 seconds.

6. The power supply system of claim 1, wherein the control unit comprises a protection controller and an automatic voltage regulator, wherein the protection controller comprises an interface to the automatic voltage regulator, wherein the protection controller is configured to generate a control signal for controlling the voltage setpoint and is further configured to supply the control signal to the automatic voltage regulator via the interface, and wherein the automatic voltage regulator is configured to determine the voltage setpoint from the control signal and to control a field voltage of the generator based on the determined voltage setpoint.

7. The power supply system of claim 1, wherein the control unit comprises an automatic voltage regulator, the automatic voltage regulator comprising a volts-per-Hertz limiter that limits the voltage setpoint based on an AC frequency of the output voltage of the generator, such that a lower AC frequency results in a lower limit for the voltage setpoint.

8. The power supply system of claim 6, wherein the automatic voltage regulator is coupled to the protection controller, wherein the automatic voltage regulator comprises a volts-per-Hertz limiter, and wherein the automatic voltage regulator is configured to control the voltage setpoint based on the control signal and, simultaneously, to limit the voltage setpoint by the volts-per-Hertz limiter based on an AC frequency of the output voltage of the generator.

9. The power supply system of claim 7, wherein at a nominal AC frequency, the voltage setpoint is limited to between 105% and 120% of the operating voltage setpoint, thereby defining a maximum ratio of the voltage setpoint to the AC frequency, wherein the volts-per-Hertz limiter is configured to limit the voltage setpoint such that the maximum ratio is not exceeded for all AC frequencies.

10. The power supply system of claim 1, wherein the control system is further configured to control the output voltage of the generator by controlling a field voltage of the generator.

11. A power system of a marine vessel, the power system comprising:
a plurality of power supply systems, wherein each power supply system of the plurality of power supply systems is configured to couple to a power distribution bus of the marine vessel; and
a power distribution bus divided into a plurality of sections, wherein each section of the plurality of sections is coupled to at least one power supply system of the plurality of power supply systems, wherein each section of the plurality of sections is connectable by bus tie breakers, and wherein the power distribution bus is configured to supply electric power generated by the plurality of power supply systems to a plurality of electric motors coupled to the power distribution bus;
wherein each power supply system of the plurality of power supply systems comprises:
a generator configured to generate electric power and to provide, in operation, an output voltage at an output of the generator, the output voltage being an AC voltage; and
a control system coupled to the generator and configured to control the output voltage of the generator based on a voltage setpoint, wherein the voltage setpoint, in operation, is set to an operating voltage setpoint;
wherein the control system comprises:
a measuring unit configured to measure a parameter of the electric power generated by the generator, wherein a fault in a component coupled to the power supply system that results in a drop in voltage of the output of the generator is determinable based on the measured parameter; and
a control unit configured to control the voltage setpoint for the output voltage of the generator based on the measured parameter, such that if a value of the parameter falls below a threshold, the voltage setpoint is reduced;
wherein the control unit is further configured to gradually increase the voltage setpoint back to the operating voltage setpoint after the fault is electrically isolated from the power supply system, thereby limiting voltage overshoot and preventing tripping of electrical components coupled to the power distribution bus of the marine vessel.

12. The power system of claim 11, wherein each power supply system of the plurality of power supply systems is configured to limit a voltage overshoot occurring after a fault to less than 125% of a nominal operating voltage of the respective power supply system by the gradual increasing of the voltage setpoint after isolation of the fault, wherein the fault is selected from the group consisting of a fault in a power supply system, a fault in the power distribution bus, and a fault in a component coupled to the power supply system or the power distribution bus.

13. The power system of claim 11, wherein the power system is configured to open, after detection of the fault, the bus tie breakers of a section of the plurality of sections of the power distribution bus in which the fault occurred, thereby isolating the fault from power supply systems coupled to remaining sections of the plurality of sections of the power distribution bus.

14. The power system of claim 11, wherein the plurality of sections of the power distribution bus are connected in a ring configuration.

15. The power system of claim 11, wherein the marine vessel comprises a dynamically positioned vessel, wherein the power system comprises a dynamically positioning equipment class 3 power system having a class 3 mode of operation, and wherein the power system is configured to operate in the class 3 mode of operation with the bus tie breakers closed between the plurality of sections of the power distribution bus.

16. A method of operating a power supply system of a marine vessel, the power supply system being coupled to a power distribution bus of the marine vessel and configured to power a plurality of electric motors coupled to the power distribution bus, the power supply system comprising a generator and a control system configured to control an output voltage of the generator based on a voltage setpoint, the method comprising:

operating the power supply system with the voltage setpoint set to an operating voltage setpoint;

measuring a parameter of electric power generated by the generator, wherein a fault in a component coupled to the power supply system that results in a drop in voltage of the output of the generator is determinable based on the measured parameter; and reducing the voltage setpoint for the output voltage of the generator if the value of the parameter falls below a threshold, and gradually increasing the voltage setpoint back to the operating voltage setpoint after the fault is electrically isolated from the power supply system, thereby limiting voltage overshoot and preventing tripping of electrical components coupled to the power distribution bus of the marine vessel.

17. The method of claim 16, wherein:

the generator is configured to generate electric power and to provide, in operation, an output voltage at an output of the generator, the output voltage being an AC voltage; and the voltage setpoint is set, in operation, to an operating voltage setpoint;

the control system comprises:

a measuring unit configured to measure the parameter of the electric power generated by the generator; and a control unit configured to control the voltage setpoint for the output voltage of the generator based on the measured parameter.

18. The power supply system of claim 4, wherein the increase in the voltage setpoint from the starting voltage setpoint to the operating voltage setpoint occurs within a time period of between about 0.5 seconds and about 2 seconds.

19. The power supply system of claim 7, wherein the automatic voltage regulator is coupled to the protection controller, wherein the automatic voltage regulator comprises a volts-per-Hertz limiter, and wherein the automatic voltage regulator is configured to control the voltage setpoint based on the control signal and, simultaneously, to limit the voltage setpoint by the volts-per-Hertz limiter based on AC frequency of the output voltage of the generator.

20. The power supply system of claim 9, wherein at the nominal AC frequency, the voltage setpoint is limited to about 110% of the operating voltage setpoint.

21. The power system of claim 12, wherein each power supply system of the plurality of power supply systems is configured to limit the voltage overshoot occurring after the fault to less than 120% of the nominal operating voltage.

\* \* \* \* \*